United States Patent Office 3,344,137
Patented Sept. 26, 1967

3,344,137
METHOD OF PREPARING TRISUBSTITUTED TRIAZINES
Henry Bader, North Plainfield, N.J., assignor to American Cyanamid Company, Stamford, Conn., a corporation of Maine
No Drawing. Filed Nov. 27, 1963, Ser. No. 326,348
8 Claims. (Cl. 260—240)

ABSTRACT OF THE DISCLOSURE

A new method of preparing 2,4,6-trisubstituted-1,3,5-triazines is described. The process comprises reacting an N-acylimidate with an amidine, O-lower alkylisourea guanidine, substituted guanidine, or S-lower alkylisothiourea. The present compounds are useful in the preparation of highly active anti-bacterial agents such as 2-sulfamilamido-4,6-diethyl-1,3,5-triazine.

---

The trisubstituted triazines prepared by the process of this invention may be illustrated by the formula:

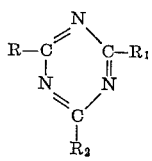

wherein R and $R_1$ are lower alkyl, amino, mononuclear aryl or lower alkoxy and $R_2$ is lower alkyl, lower alkoxy, lower alkenyl mononuclear aryl, lower alkylthio, or mononuclear aryl.

The process of this application comprises reacting an N-acylimidate with an amidine, O-lower alkylisourea guanidine, substituted guanidine, or S-lower alkylisothiourea. The reaction may be illustrated as follows:

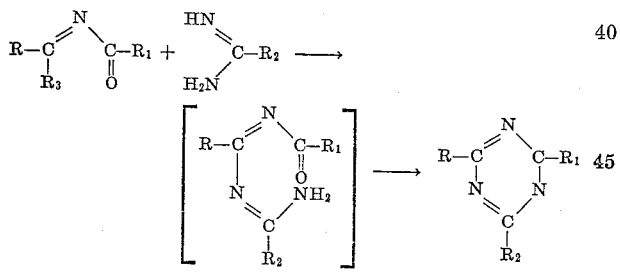

wherein R, $R_1$ and $R_2$ are as defined above and $R_3$ is lower alkoxy or lower alkylthio.

The starting N-acylimidates of this invention have been described in Amer. Chem. J. 19 129–139 (1897) and 20, 64–76 (1898). The present process is carried out by reacting an N-acylimidate with an O-alkyl isourea, s-alkyl isothiourea, guanidine, etc. preferably in an inert solvent such as lower alkanols, benzene, toluene, ether, petroleum-ether or the like. Usually, the reaction proceeds spontaneously at room temperature and may continue to substantial completion during a period ranging from several hours to several days. Alternately, the reaction process may be speeded up to substantial completion by warming for a much shorter period of time. Overall the reaction will take place at a temperature of from about 20° C. to 75° C. for a period of from one to 24 hours. Following completion of the reaction, the product may be recovered and purified by methods well known to those skilled in the art such as solvent extraction, fractional distillation, adsorption elution, chromatography, crystallization and the like. The compounds prepared by the process of this invention may be, for example, 2,4-diethyl-6-methoxy-1,3,5-triazine,
2-ethyl-4-methoxy-6-styryl-1,3,5-triazine,
2-amino-4-ethyl-6-styryl-1,3,5-triazine,
2-ethyl-4-methyl-6-styryl-1,3,5-triazine,
2-ethyl-4-methyl-6-methoxy-1,3,5-triazine,
2-ethyl-4-phenyl-6-methylthio-s-triazine,
2-ethyl-4-methyl-6-phenyl-s-triazine
and the like.

The triazines prepared by the process of the present invention are useful as intermediates in the preparation of various substituted triazino-sulfonamides. For example, 2,4-diethyl-6-methoxy-1,3,5-triazine can be reacted with sodium sulfanilamide to produce 2-sulfanilamido-4,6-diethyl-1,3,5-triazine. The latter compound is highly active as an anti-bacterial agent with low toxicity and is claimed in copending application Ser. No. 802,003 filed Mar. 26, 1959, now U.S. Patent 3,252,974. In preparing 2-sulfanilamido-4,6-diethyl-1,3,5-triazine by reacting 2,4-diethyl-6-methoxy-1,3,5-triazine with sulfanilamide, the sodium salt of sulfanilamide is obtained. However, the sodium salt can be converted into 2-sulfanilamido-4,6-diethyl-1,3, 5-triazine by treatment with acid. In a similar manner, other 2,4,6 - trisubstituted - 1,3,5 - triazines except those wherein $R_2$ is lower alkyl can be reacted with sodium sulfanilamide or similar alkali metal sulfonamides to prepare biologically active sulfanilamido triazines.

The following examples illustrate the preparation of representative 2,4,6-trisubstituted-1,3,5-triazines and intermediates.

EXAMPLE I

*Preparation of isopropyl N-propionylpropionimidate*

A solution of 55.5 g. of proprionyl chloride in 100 ml. of methylene chloride is added dropwise to a stirred solution of 69.1 g. of isopropyl propionimidate and 63.8 g. of triethylamine in 400 ml. of methylene chloride, while the temperature is kept at —20° C. The resulting mixture is stirred for five hours, and allowed to stand for two days at room temperature. The solid is filtered, and the filtrate distilled, yielding 90.5 g. (88.0%) of isopropyl N-propionylpropionimidate, boiling point 78–80/15 mm., $n_D^{29}$ 1.4320.

EXAMPLE II

*Preparation of 2,4-diethyl-6-methoxy-1,3,5-triazine*

A solution of 40.65 g. of O-methylisourea p-toluenesulfonate in 50 ml. of methanol is added with stirring to a solution of sodium methoxide (from 3.80 g. of sodium) in 75 ml. of methanol. Anhydrous ether (500 ml.) is added, inorganic salts are filtered, and to the filtrate is added 25.7 g. of isopropyl N-propionylpropionimidate (Example I). The solution is allowed to stand 72 hours at room temperature, most of the ether is distilled, and the residue is heated on steam bath for two hours. The remaining solvent is removed, and the residue is extracted with 150 ml. of hot pentane. Fractional distillation of the extract gives as the main product 8.92 g. of 2,4-diethyl-6-methoxy-1,3,5-triazine, boiling point 100°/15 mm.

EXAMPLE III

*Preparation of isopropyl N-cinnamoylpropionimidate*

A solution of 50.0 g. of cinnamoyl chloride in 70 ml. of methylene chloride is added dropwise under stirring to a solution of 34.5 g. of isopropyl propionimidate in 150 ml. of methylene chloride, through which trimethylamine gas is simultaneously passed. Reaction temperature is kept below 0° C. After the addition of the chloride is complete, addition of trimethylamine is continued for 10 minutes. The solid is filtered and washed with ether, and the filtrate evaporated to dryness. To the residue pentane is added and the resulting solution is left at 0° C.

After filtration of a small amount of solid which crystallizes, the filtrate is distilled, yielding 61.15 g. (83.1%) of isopropyl N-cinnamoylpropionimidate, boiling point 121.5°/0.2 mm.

EXAMPLE IV

*Preparation of 2-ethyl-4-methoxy-6-styryl-1,3,5-triazine*

A solution of 12.15 g. of O-methylisourea hydrochloride in 40 ml. of methanol is added dropwise at 10° C. to a stirred solution of sodium methoxide (from 2.53 g. of sodium) in 60 ml. of methanol. To this solution 24.53 g. of isopropyl N-cinnamoylpropionimidate is added, and the mixture allowed to stand 67 hours at room temperature. Sodium chloride is filtered and the filtrate evaporated to dryness. The residue is extracted with pentane, and the pentane solution distilled, removing distillate boiling up to 122°/10 mm. The residue is adsorbed on alumina column, and the latter eluted first with pentane, then with 9:1 pentane-ether mixture. The latter is eluted with crude triazine, which crystallizes from pentane. The pure 2-ethyl-4-methoxy-6-styryl-1,3,5-triazine (3.76 g.) crystallizes in pale yellow rosettes of needles, melting point 52–52.5° C.

EXAMPLE V

*Preparation of 2-ethyl-4-methyl-6-styryl-1,3,5-triazine*

To a stirred solution of 5.2 g. of acetamidine hydrochloride in 75 ml. of tert. butanol, 1.3 g. of sodium hydride (suspended in oil) is added at 35° C. When hydrogen evolution subsides, 12.25 g. of isopropyl N-cinnamoylpropionimidate is added and the mixture allowed to stand four days at room temperature. The mixture is diluted with pentane, the solid filtered, and the filtrate evaporated. Distillation gives 6.0 g. (53.3%) of 2-ethyl-4-methyl-6-styryl-1,3,5-triazine, boiling point 125°/0.2 mm.

EXAMPLE VI

*Preparation of isopropyl N-acetylpropionimidate*

A solution of 23.7 g. of acetyl chloride in 50 ml. of methylene chloride is added to a stirred solution of 34.5 g. of isopropyl propionimidate and 33.45 g. of triethylamine in 400 ml. of methylene chloride at —20° C. Stirring is continued for 18 hours at room temperature, the solid is filtered, solvent removed and the residue fractionated through a 1' Fenske column, yielding 34.8 g. (73.8%) of isopropyl N-acetylpropionimidate, boiling point 63°/10 mm.

EXAMPLE VII

*Preparation of 2-ethyl-4-methyl-6-methoxy-1,3,5-triazine*

Isopropyl N-acetylpropionimidate (31.44 g.) is added to a solution of O-methylisourea (prepared as in Example 4 from 22.1 g. of its hydrochloride and 4.6 g. of sodium) in 125 ml. of methanol), diluted with 300 ml. of ether. After 5 days at room temperature, the solid is filtered, ether distilled, and the methanolic solution is heated under reflux for 2 hours. Methanol is distilled, the residue extracted with pentane, and the pentane solution fractionated. Analysis of the product by gas chromatography indicates a yield of 13.34 g. of 2-ethyl-4-methyl-6-methoxy-1,3,5-triazine, which distilled at 90°/13 mm.

EXAMPLE VIII

*Preparation of 2-amino-4-ethyl-6-styryl-1,3,5-triazine*

Isopropyl N-cinnamoylpropionimidate (9.8 g.) is added to a suspension of guanidine base (1.2 g.) in 15 ml. of tert. butanol. The resulting solution is kept 20 hours at room temperature, then filtered from 0.18 g. of 2,4-diamino-6-ethyl-s-triazine. The filtrate is evaporated to dryness, redissolved in methylene chloride, and the resulting solution is extracted three times with 2 N sulfuric acid. The aqueous solution is made alkaline and cooled to 0° C. Filtration gives 1.05 g. (23.3%) of 2-amino-4-ethyl-6-styryl-s-triazine. Crystallization from pentane or ether gives two polymorphic forms of the triazine, melting at 112° C. and 122–123° C. respectively. They gave identical infrared spectrum in carbon tetrachloride solution, but different spectra in Nujol mull.

EXAMPLE IX

*Preparation of isopropyl N-benzoylpropionimidate*

A solution of 18.1 g. of benzoyl chloride in 150 ml. of methylene chloride is added dropwise to a stirred solution of 23.3 g. of isopropyl propionimidate and 22.3 g. of triethylamine in 150 ml. of methylene chloride at —20° C. Stirring is continued for 18 hours at room temperature. The solid is filtered, the solvent distilled. Pentane is added to the residue and a small amount of solid again filtered. After removal of solvent distillation gives 25.9 g. (59.0%) of isopropyl N-benzoylpropionimidate, B.P. 99°/0.2 mm., $n_D^{31}$ 1.5140.

EXAMPLE X

*Preparation of 2-ethyl-4-phenyl-6-methylthio-1,3,5-triazine*

Isopropyl N-benzoylpropionimidate (10.96 g.) is added to a solution of S-methylisothiourea (prepared as in Example V from 6.96 g. of its hydrochloride and 1.3 g. of sodium hydride) in 50 ml. of t-butanol. After stirring 3 days at room temperature, the mixture is diluted with pentane, filtered and the filtrate concentrated and adsorbed on alumina. Pentane eluate gives 2.3 g. of a mixture of triazines, which is shown by vapour phase chromatography to contain 1.14 g. of 2-ethyl-4-phenyl-6-methylthio-1,3,5-triazine. A sample, isolated by VPC melted at 31°–33° C., boiling point 135°/0.3 mm., $n_D^{27°}$ 1.6110.

EXAMPLE XI

*Preparation of 2-ethyl-4-methyl-6-phenyl-1,3,5-triazine*

Isopropyl N-benzoylpropionimidate (10.96 g.) is added to a solution of acetamidine (prepared from 5.2 g. of its hydrochloride and 1.3 g. of sodium hydride) in 75 ml. of t-butanol. After stirring at room temperature for 2 days, the mixture is filtered, the filtrate evaporated to dryness and extracted with pentane. Distillation of the extract gives 0.94 g. of 2-ethyl-4-methyl-6-phenyl-1,3,5-triazine, boiling point 88°/0.1 mm., $n_D^{30°}$ 1.5700.

EXAMPLE XII

*Preparation of methyl N-propionylbenzimidate*

A solution of 30.8 g. of propionyl chloride in 100 ml. of methylene chloride is added dropwise at 0° to a stirred solution of 45 g. of methyl benzimidate and 37.5 g. of triethylamine in 150 ml. of methylene chloride. Stirring is continued for 22 hours at room temperature. The solid is filtered, the solvent distilled. Pentane is added to the residue and more solid is filtered. After removal of the solvent, distillation gives 48.4 g. (76.0%) of methyl N-propionylbenzimidate, boiling point 158°/22 mm., $n_D^{29°}$ 1.5290.

EXAMPLE XIII

*Preparation of 2-ethyl-4-methyl-6-phenyl-s-triazine*

Methyl N-propionylbenzimidate (19.12 g.) was added to a solution of acetamidine (prepared from 10.4 g. of the hydrochloride and 5.94 g. of sodium methoxide) in 125 ml. of methanol and 500 ml. of diethyl ether. After standing at room temperature for 65 hours, the mixture is filtered, the filtrate evaporated to dryness, and the liquid residue extracted with pentane. The pentane solution is filtered through 150 g. of alumina, and the filtrate is reconcentrated and distilled. 2-Ethyl-4-methyl-6-phenyl-s-triazine (9.42 g.; 47.6%) is obtained as an oil, boiling point 88°/0.1 mm., $n_D^{30°}$ 1.5700.

EXAMPLE XIV

*Preparation of 2-ethyl-4-phenyl-6-methylthio-s-triazine*

Methyl N-propionylbenzimidate (19.12 g.) is added to a solution of S-methylisothiourea (prepared from 12.66 g. of the hydrochloride and 5.94 g. of sodium methoxide) in 100 ml. of methanol and 350 ml. of anhydrous ether. After stirring at room temperature for 67 hours and work-up similar to that of the preceding example, the pentane eluate from chromatography on alumina is freed from solvent. Distillation of the residue gives 5.79 g. (25.0%) of 2-ethyl-4-phenyl-6-methylthio-s-triazine, boiling point 135°/0.3 mm., melting point 31–33°, $n_D^{27°}$ 1.6110.

EXAMPLE XV

*Preparation of sodium salt of 2-sulfanilamido-4,6-diethyl-s-triazine*

A solution of sodium sulfanilamide is prepared by adding 43 parts of sulfanilamide to a solution of 5.75 parts of metallic sodium in 200 parts of absolute methanol. To this solution there is added 42 parts of 2,4-diethyl-6-methoxy-s-triazine prepared immediately above and the resulting solution is refluxed gently with exclusion of moisture for 70 hours. Cooling of the reaction mixture yielded a copious white solid which is filtered, washed and dried. Concentration of the filtrate, followed by cooling, yields additional material. Analysis of the product together with its chemical properties demonstrates it to be the sodium salt of 2-sulfanilamido-4,6-diethyl-s-triazine.

EXAMPLE XVI

*Preparation of 2-sulfanilamido-4,6-diethyl-s-triazine*

A total of 55 parts of the sodium salt of 2-sulfanilamido-4,6-diethyl-s-triazine is dissolved in 175 parts of water. To this solution is added (dropwise with stirring) about 27 parts of 6 N hydrochloric acid (final pH 3–3.5). The resulting granular white precipitate is filtered, washed and dried. This material can be dissolved in boiling ethanol, treated with activated charcoal, filtered and cooled. The resulting white crystals melted at 190.0–190.5° C. This substance can be isolated directly from the reaction mixture by partial evaporation, addition of water and finally acidification as above.

I claim:
1. A process of preparing substituted 1,3,5-triazines of the formula:

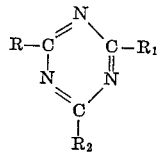

wherein R and R₁ are selected from the group consisting of lower alkyl, amino, mononuclear aryl and lower alkoxy and R₂ is selected from the group consisting of lower alkyl, lower alkoxy, lower alkenyl mononuclear aryl, lower alkylthio and mononuclear aryl which comprises contacting an acylimidate of the formula:

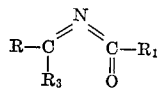

wherein R and R₁ are as defined above and R₃ is selected from the group consisting of lower alkoxy and lower alkylthio with a compound of the formula:

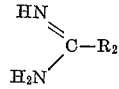

wherein R₂ is as defined above, at a temperature within the range of about 20° C. to about 75° C. for a period of from 1 to about 24 hours in the presence of an inert solvent.

2. A method of preparing 2,4-diethyl-6-methoxy-1,3,5-triazine which comprises contacting isopropyl-N-propionylimidate with O-methyl isourea at a temperature within the range of about 20° C. to about 75° C. for a period of from 1 to about 24 hours in the presence of an inert solvent.

3. A method of preparing 2-ethyl-4-methoxy-6-styryl-1,3,5-triazine which comprises contacting isopropyl N-cinnamoylpropionimidate with ortho-methylisourea hydrochloride at a temperature within the range of about 20° C. to about 75° C. for a period of from 1 to about 24 hours in the presence of an inert solvent.

4. A method of preparing 2-ethyl-4-methyl-6-styryl-1,3,5-triazine which comprises contacting isopropyl-N-cinnamoylpropionimidate with acetamidine hydrochloride at a temperature within the range of about 20° C. to about 75° C. for a period of from 1 to about 24 hours in the presence of a solvent.

5. A method of preparing 2-ethyl-4-methyl-6-methoxy-1,3,5-triazine which comprises contacting isopropyl-N-acetylpropionimidate with O-methyl isourea at a temperature within the range of about 20° C. to about 75° C. for a period of from 1 to about 24 hours in the presence of an inert solvent.

6. A method of preparing 2-amino-4-ethyl-6-propyl-N-cinnamoylpropionimidate with guanidine at a temperature within the range of about 20° C. to about 75° C. for a period of from 1 to about 24 hours in the presence of an inert solvent.

7. A method of preparing 2-ethyl-4-phenyl-6-methylthio-1,3,5-triazine which comprises contacting isopropyl N-benzoyl-propionimidate with S-methylisothiourea at a temperature within the range of about 20° C. to about 75° C. for a period of from 1 to about 24 hours in the presence of an inert solvent.

8. A method of preparing 2-ethyl-4-methyl-6-phenyl-1,3,5-triazine which comprises contacting isopropyl N-benzoylpropionimidate with acetamidine hydrochloride at a temperature within the range of about 20° C. to about 75° C. for a period of from 1 to about 24 hours in the presence of an inert solvent.

References Cited

UNITED STATES PATENTS 3,203,550   8/1965   Schaefer _____ 260—248

JOHN D. RANDOLPH, *Primary Examiner.*